United States Patent [19]

Druyff et al.

[11] 3,818,144

[45] June 18, 1974

[54] MULTIFREQUENCY TO DIAL PULSE SIGNAL CONVERTER

[75] Inventors: Gerbrand Druyff, Webster, N.Y.; Harry C. Mullen, Jr., Newark, Del.; Amin Y. Zaky, Rochester, N.Y.

[73] Assignee: Stromberg-Carlson Corporation, Rochester, N.Y.

[22] Filed: Apr. 12, 1972

[21] Appl. No.: 243,326

[52] U.S. Cl. .......................... 179/16 EC, 179/84 VF
[51] Int. Cl. .......................................... H04m 3/02
[58] Field of Search .............. 179/84 VF, 16 EC, 90

[56] References Cited

UNITED STATES PATENTS

| | | | |
|---|---|---|---|
| 3,156,775 | 12/1959 | Ioakimidis | 179/16 EC |
| 3,430,002 | 2/1969 | Roscoe | 179/16 EC |
| 3,445,606 | 3/1966 | Brightman | 179/84 VF |
| 3,453,391 | 5/1966 | Hubbell | 179/16 EC |
| 3,701,851 | 12/1970 | Starrett | 179/16 EC |

*Primary Examiner*—Kathleen H. Claffy
*Assistant Examiner*—Gerald Brigance
*Attorney, Agent, or Firm*—Charles C. Krawczyk

[57] ABSTRACT

In a telephone switching network having a multifrequency to dial pulse signal converter for converting multifrequency calling signals received from local stations to dial pulse signals for transmission to other switching networks the multifrequency calling signals are separated from the dial tone transmitted back from the other switching networks before being processed by the converter. The converter is also designed to process an unlimited number of calling signals.

19 Claims, 6 Drawing Figures

MULTIFREQUENCY TO DIAL PULSE SIGNAL CONVERTER

BACKGROUND OF THE INVENTION

This invention pertains to multifrequency to dial pulse signal converters used in telephone switching networks for converting multifrequency calling signals received from local stations to dial pulse signals for transmission to other switching networks.

Calling signals are used in telephone switching systems to identify the telephone number of a called station to enable a telephone switching network to establish a connection thereto from the calling station. Each signal in a group of calling signals represents a different digit of the called number. Since the introduction of pushbutton telephone subsets, older switching systems such as step-by-step have had to be modified in order to handle the new type of multifrequency calling signals generated therein. Unlike the older rotary dial subsets which generate a calling signal comprising a stream of dial pulses the number of which represent the corresponding digit value of the called number, pushbutton telephone subsets generate AC signals wherein different combinations of two out of seven individual frequencies are used to uniquely identify the various numerical digit values.

With dial pulse signalling the return of dial tone to a calling station served by a local switching network from some other switching network creates no problem since the calling signal detection equipment in the local switching network is insensitive to the dial tone which is an AC signal, but is not insensitive to dial pulses which are DC signals. Consequently the dial pulse calling signals from the calling station are processed only while the dial tone signal from the other switching network remains undetected so that it does not interfere with the processing. With multifrequency signalling however, dial tone problems can arise in connections to other networks not equipped to handle multifrequency signals, since the dial tone signals from the other networks are AC and will be detected in the same calling signal detection equipment of the local telephone switching network as used for detecting and converting the multifrequency calling signals to dial pulses for transmission to the other switching networks. The combination of dial tone and multifrequency calling signals can result in a transmuted and unrecognizable calling signal which is either rejected completely by the detector or is erroneously processed. This situation is normally avoided by utilization of a precise dial tone signal having a fixed standard frequency which is rejected by the detector equipment in the switching network. When non-precise dial tone viz. an AC signal having a non-standard frequency is used this situation is not avoided and can lead to the aforementioned undesirable results.

The problem of transmutation of multifrequency calling signals by non-precise dial tones is not uncommon since there are a multitude of private and public telephone switching exchanges interconnected with each other many of which have older equipment not designed to generate precise dial tone. This problem can arise, for instance, when an outside call is made from a pushbutton telephone subset in a private branch exchange which of course would be equipped to handle multifrequency signals from local calling stations within the exchange. After a first dial tone is received from the branch exchange the digit nine is keyed to establish a connection from the exchange to the outside switching network which then returns its own dial tone to the calling station to apprise the caller that the connection has been completed and that he may begin signalling the telephone number of the station he wishes to call. Assuming that the outside switching network is not equipped to handle multifrequency signals a multifrequency to dial pulse signal converter in the exchange receives the multifrequency calling signals from the local calling station and converts them to dial pulses for outpulsing to the outside switching network. Until keying of the first digit of the called number is completed both the multifrequency calling signal corresponding thereto and the dial tone from the outside network are present on the telephone line and both are applied to the converter. If the dial tone is non-precise the converter will not reject it and the resultant calling signal processed will not be that which was transmitted but one which is transmuted and unrecognizable and therefore not suitable for processing.

The probelm can also arise when a single telephone customer has a number of private branch exchanges physically separated but electrically interconnected by tie lines. A caller at one exchange can call someone at another exchange over a direct path between the two or a path through one or more of the other exchanges. Each exchange involved in the path is accessed through a two or three digit code number which the caller signals. When an exchange is first connected into the path, dial tone is returned to the caller apprising him that he can continue signalling (to either connect through to another exchange or to connect to the called party if he is located within that exchange). While the next calling signal is transmitted over the telephone line following the connection to this exchange, dial tone will also be present on the line from the connected exchange. If the dial tone is non-precise and multifrequency signals are being generated by the caller and processed by a multifrequency to dial pulse signal converter then transmutation of the signal will occur.

Another problem relative particularly to tie line customers is the limited number of multifrequency calling signals which can be processed by present multifrequency to dial pulse signal converters, the number being limited to the digit storage capacity of the telephone switching network translating equipment. Among other things this equipment recognizes when a complete telephone number has been signalled by the caller whereupon it provides a signal to release the converter so that it can be used for processing other telephone connections. Although this storage capacity is large enough to accommodate most telephone customer needs it does create limitations in some cases such as inhibiting the flexibility of tie line customer service since it restricts the number of private branch exchanges through which a tie line call can be routed. The detrimental effect of this limitation is especially noticeable when traffic congestion ties up direct lines between exchanges and alternate indirect routes through other exchanges via less busy paths are required.

With the foregoing in mind it is an object of the present invention to provide a new and improved multifrequency to dial pulse signal converter wherein the multifrequency signals and dial tone signals are separated before the multifrequency signals are processed so as to avoid their transmutation by the latter into unrecognizable signals not suitable for processing.

It is a further object of the invention to provide a new and improved multifrequency to dial signal pulse converter which is capable of processing an unlimited number of multifrequency calling signals.

BRIEF DESCRIPTION OF THE INVENTION

In a multifrequency to dial pulse signal converter used in a switching network for converting multifrequency calling signals received from local stations to dial pulse signals for transmission to other switching networks means are provided for separating the multifrequency calling signals from the dial tone transmitted back from the other switching networks so that only the multifrequency signals are processed by the converter.

In the specific embodiment described a four-wire hybrid circuit is used to provide two independent paths over which AC signals are transmitted between the calling station served by a local switching network and another switching network which serves the called station. AC signals from the other switching network including dial tone signals are transmitted to the calling station through a first path of the hybrid circuit, while AC signals from the calling station, including multifrequency calling signals, are transmitted to the called station over the second path. The multifrequency signals are applied for processing to a multifrequency detector in the converter which is connected to the second path so that it is isolated from signals transmitted over the first path. Consequently tone dial signals over the first path including those which are non-precise are not applied to the multifrequency detector so that they cannot be combined with the multifrequency calling signals to create a transmuted and unrecognizable signal which is not suitable for processing.

The converter also includes means for processing an unlimited number of multifrequency calling signals so that a caller with a pushbutton telephone subset may key any number of digits required for routing the call. Specifically the converter includes a plurality of memory units which are used for storing digit information before it is used for digit outpulsing. These memory units are sequentially enabled to store the information by an in-digit steering chain as the multifrequency calling signals are received. The memory units are sequentially enabled to release the stored information as required for digit outpulsing by an out-digit steering chain. Both the in-digit and out-digit steering chains are provided with means for recycling the sequential enabling operations after the last memory unit is enabled thus enabling the first memory unit again. This recycling can be repeated any number of times thereby permitting the converter to process an unlimited number of calling signals. After the connection to the called station is completed the converter is released automatically or in response to a signal from the caller so that it can be used for establishing other telephone connections.

DESCRIPTION OF THE PREFERRED EMBODIMENT

Figure 1:
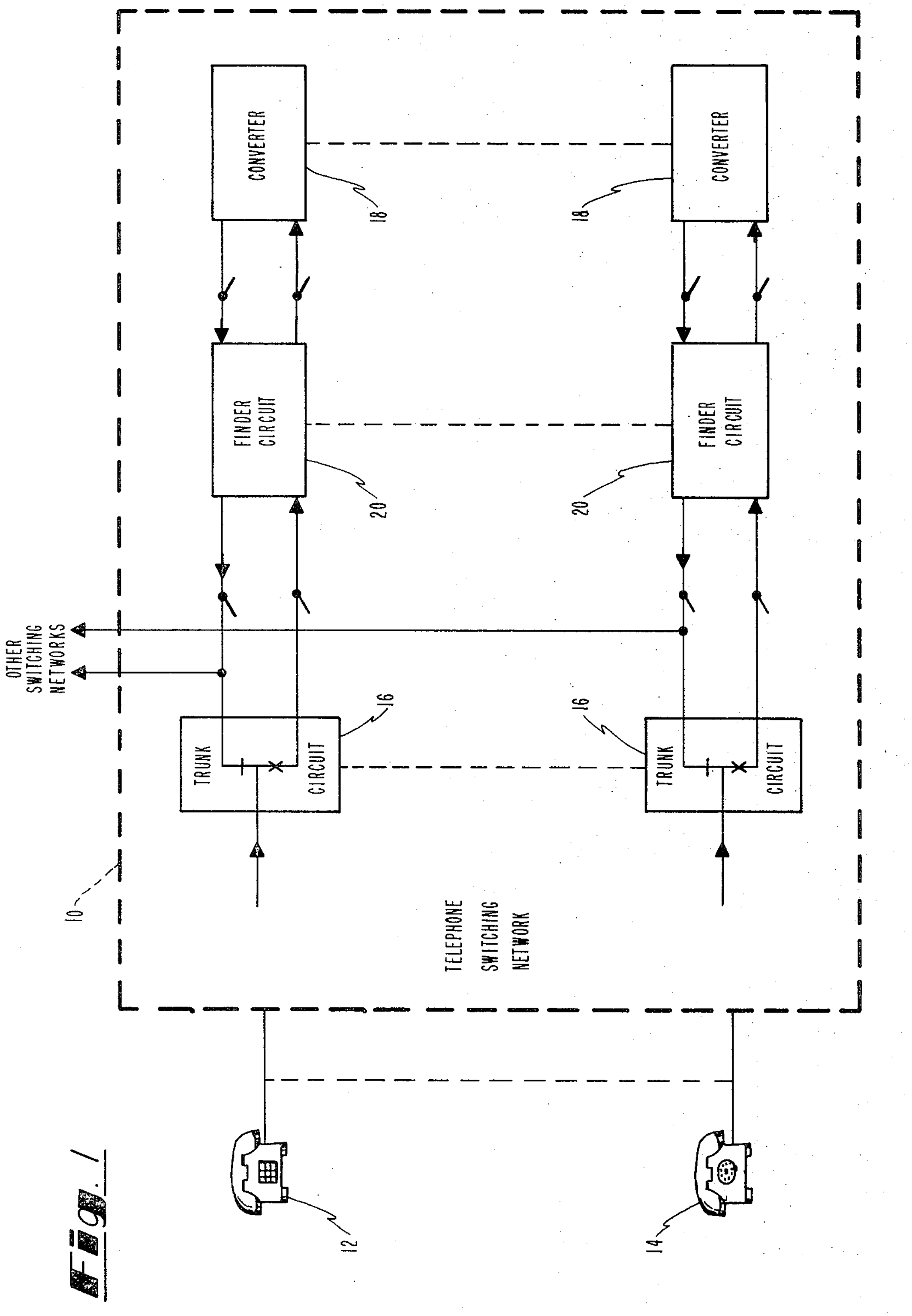
FIG. 1 illustrates in block form a telephone switching network serving both rotary and pushbutton telephone subsets which is equipped with a plurality of multifrequency to dial pulse signal converters.

As shown in FIG. 1, block number 10 represents a telephone switching network such as a PBX which is used for establishing telephone connections from and to local stations some of which may have pushbutton telephone subsets such as 12 for multifrequency signalling while others may have rotary dial telephone subsets such as 14 for dial pulse signalling. Connections to stations served by other telephone switching networks not equipped to handle multifrequency signalling and some of which may not be equipped with precise dial tone are made via trunk circuits 16 located in the network 10. Each such connection involves a trunk circuit 16 which is connected to a converter 18 through a finder circuit 20 during the course of signalling. Since an individual converter 18 and finder circuit 20 are seized until the connection to the called station is completed a plurality of these are provided to permit processing more than one call at a time. The finder circuit 20 of which there are many well known types, can be arranged to locate and connect an idle converter 18 to a trunk circuit 16 requiring service or to connect a converter 18 uniquely associated therewith to the trunk circuit 16 requiring service.

The converter 18 receives from the calling station the calling signals identifying the called number each signal representing a single digit. When multifrequency signals are received the converter 18 detects each multifrequency signal, converts it into the proper number of dial pulses corresponding to the numerical value of the digit and outpulses the same to the other switching network. When the signal received for the first digit already comprises dial pulses generated by a rotary dial telephone, the converter 18 recognizes that there is no need to convert multifrequency signals to dial pulse signals and therefore releases, only after reproducing the number of dial pulses for the first digit for transmission to the other switching network. The dial pulse signals for the remaining digits are transmitted through the trunk circuit 16 directly to the other telephone switching network without passing through the converter 18.

The trunk circuit 16 is initially connected through the converter 18 and finder circuit 20 to the other telephone switching network by relay contacts located in the finder circuit 20 and trunk circuit 16 which are actuated by their relays in response to the customary ground appearance on the trunk circuit sleeve lead. This path remains intact during multifrequency signalling until the connection to the called station is completed or if dial pulse signalling is used until the converter 18 receives and reproduces the dial pulses corresponding to the first digit of the called number. When either of the foregoing occurs the converter 18 and finder circuit 20 are released to service other telephone connections and a direct connection to the other switching network from the trunk circuit 16 is established by the reverting of the contacts in the trunk circuit 16 and finder circuit 20 to their normal positions.

Since a part of the invention is the modification of a converter so that it may process an unlimited number of calling signals, telephone translating equipment is not relied upon for ascertaining when a complete telephone number has been signalled for purposes of releasing the converter 18 at finder circuit 20. In the case of calls placed with multifrequency signalling the converter 18 and finder circuit 20 are released in one of three different ways independent of the translating equipment once the telephone connection to the called station is completed. If an answer supervision signal is returned from the other switching network when the call is answered, the signal is detected and used by the converter 18 to effectuate immediate release. Release also occurs automatically under the control of a timing circuit upon the passage of a preset period of time, such as 4–12 seconds, following outpulsing of the last digit to the other switching network. The preset period which begins to run after the out-pulsing of each digit of the called number, is set long enough to provide telephone subscribers with an adequate waiting period between keyed signals so that release does not occur prematurely under normal conditions. This type of automatic release occurs if the called party does not answer the call before the preset period lapses or if he does so answer when no answer supervision signal is provided. Release can also be effectuated by the calling party himself after he has finished signalling by his keying one of the available telephone pushbuttons used for special features, thereby providing a signal which is intrepreted by the converter 18 as a release signal which is immediately acted upon.

Figure 2:
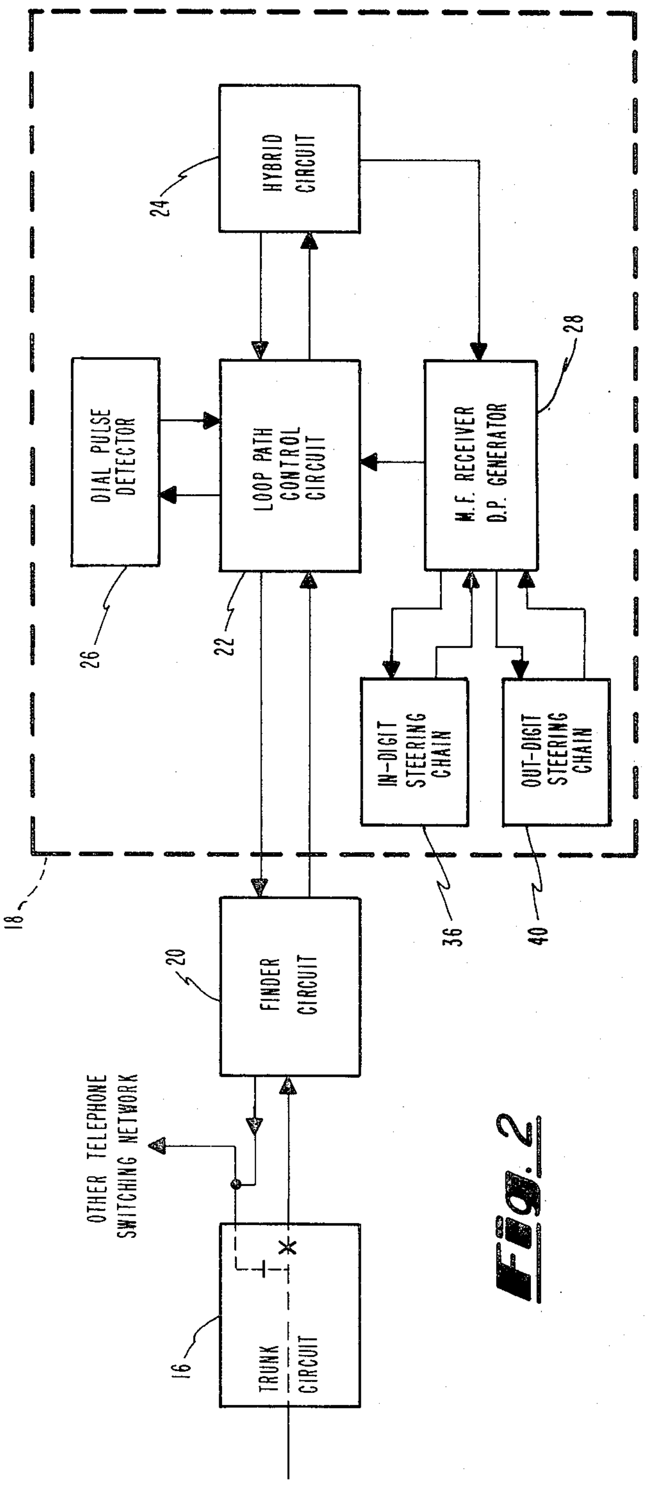
FIG. 2 illustrates in block form the details of the multifrequency to dial pulse signal converter of FIG. 1 including the novel features of the invention.

As shown by blocks in FIG. 2 the converter 18 comprises a number of components. The telephone connection tip and ring leads pass through a loop path control circuit 22 which contains the actual relay contacts for producing and transmitting the dial pulse signals to the other telephone switching network. The loop path control circuit 22 also contains relays for establishing ground and power connections to the other components when the converter 18 is seized. The tip and ring leads also pass through a four-wire hybrid circuit 24 which functions to separate the multifrequency calling signals from dial tones so that the former are not transmuted by the non-precise dial tones into some unrecognizable signal before being processed. The specific means for accomplishing this will be described hereinbelow. A dial pulse detector 26, which is well known in the art, detects whether or not the first calling signal received by the converter 18 comprises dial pulses. If so, the detector 26 causes the converter 18 and finder circuit 20 to release so that the remaining digit signals are passed directly to the other telephone switching network through the trunk circuit 16 as described earlier. If the first calling signal is of the multifrequency type, the dial pulse detector 26 is not actuated and the converter 18 and finder circuit 20 remain seized until the connection to the called station is completed.

Figure 3:
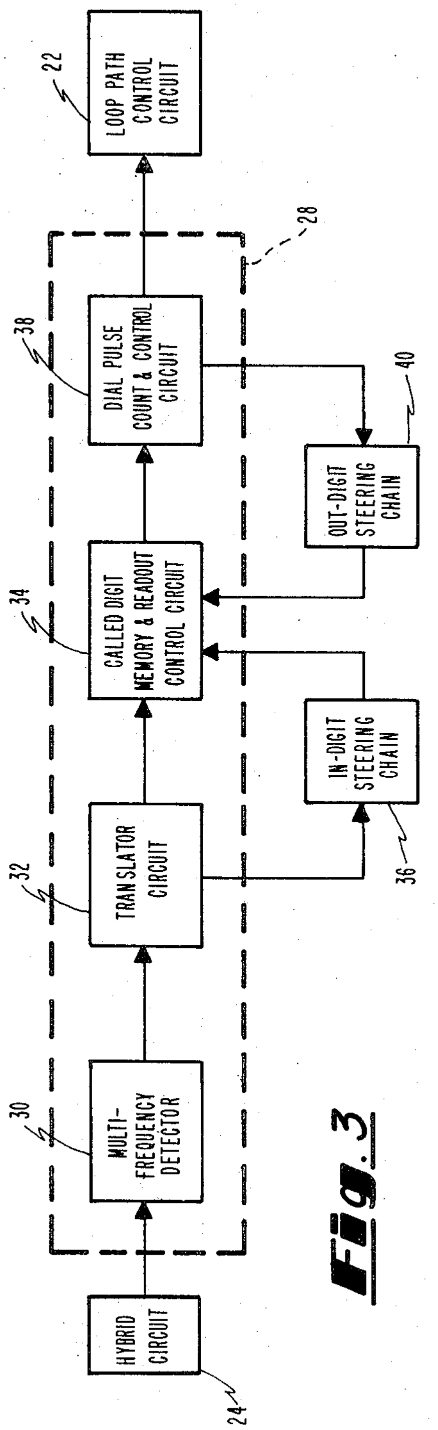
FIG. 3 illustrates in block form the various standard components used in the multifrequency receiver-dial pulse generator shown in FIG. 2.

Multifrequency calling signals are passed through the hybrid circuit 24 to a multifrequency receiver-dial pulse generator 28 which converts the multifrequency signals to equivalent dial pulse signals for transmission to the other switching network via the loop path control circuit 22. The multifrequency receiver-dial pulse generator 28 comprises all well known components which are shown as blocks in FIG. 3. Each multifrequency calling signal is applied to the input of a multifrequency detector 30 which in a standard manner produces a signal on two of its seven output leads indicating the frequencies of the two AC signals that comprise the input signal, thereby uniquely identifying the digit numerical value. The output from the detector 30 is then applied to the input of a translator circuit 32 which translates the two out of seven digital information to two out of five coded information by producing a signal on two of its five output leads indicative of the digit value. This two out of five information is applied to a called digit memory and readout control circuit 34 where it is stored until it is ready to be released for use during outpulsing. The information for each digit is applied to one of nine individual memory units (not shown) of the control circuit 34 in proper sequential order under the control of an in-digit steering chain 36. The operation of the in-digit steering chain 36 is controlled by the translator circuit 32 as will be detailed hereinafter.

The digit information from the memory and readout control circuit 34 is released and applied in proper sequential order to a dial pulse count and control circuit 38 which controls the outpulsing in the loop path control circuit 22 to ensure that the number of dial pulses for each digit outpulsed is the correct equivalent of its corresponding multifrequency signal. The sequential release of the digit value information from the nine memory units of the control circuit 34 for outpulsing is under the control of an out-digit steering chain 40, the operation of which is controlled by the dial pulse count and control circuit 38. The out-digit steering chain 40 will also be described in detail later.

Outpulsing begins as soon as the signal information for the first digit is received by the memory and readout control circuit 34. The in-digit and out-digit steering chains prepare the control circuit 34 for receiving and releasing the first digit information upon siezure of the converter 18 so that for this first digit, storage and outpulsing occur simultaneously. Since the generation of equivalent dial pulses entails more time then that necessary to generate the multifrequency signal, the control circuit 34 is required as a buffer between the two, storing the signal information until it can be used. The converter 18 is arranged so that digit information is released for outpulsing under the control of the out-digit steering chain 40 simultaneous with the storage of information for subsequent digits under the control of the in-digit steering chain 36. The nine individual memory units of the control circuit 34 permit storing information for a corresponding number of digits at any one time. Furthermore, nine digits can be sequentially processed without using any memory unit more than once, the first digit being applied to the first memory unit, the second digit to the second memory unit and so on. In the event that the called number contains more than nine digits the in-digit and out-digit steering chains are designed for recycling so that the tenth digit would be applied to the first memory unit, the eleventh digit to the second memory unit and so on. This presupposes that by the time recycling reaches a particular memory unit, the prior digit in that unit has already been outpulsed thus releasing the unit for storing another digit. As will be discussed below means are provided to avoid the situation wherein two digits are processed by the same memory unit at the same time. Recycling can take place any number of times, thus providing capability to process an unlimited number of calling signals.

Figure 4:
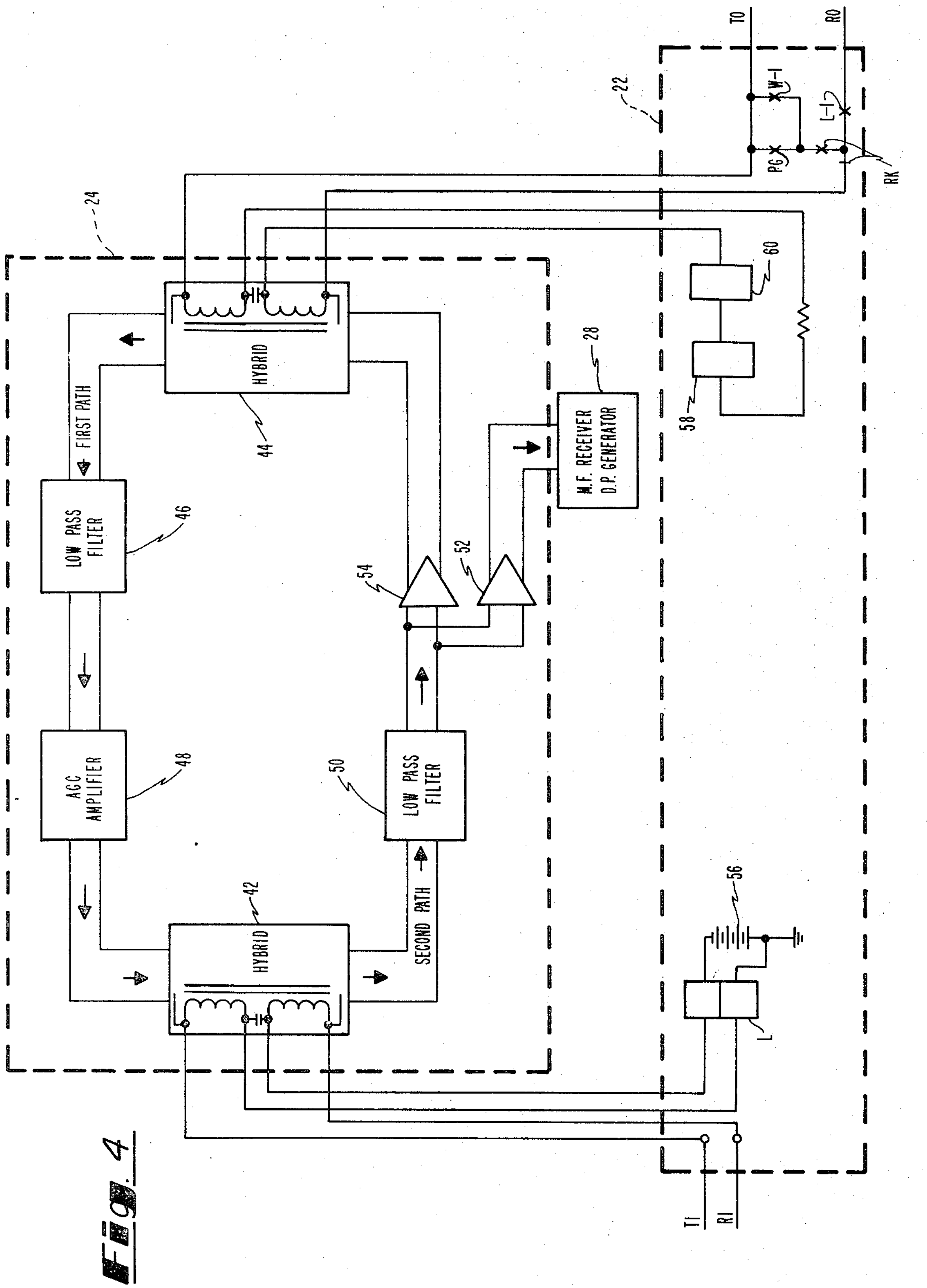
FIG. 4 illustrates in detail the four-wire hybrid circuit shown in FIG. 2 as well as that portion of the loop path control circuit necessary to understand the invention.

Having discussed its operation generally, portions of the converter 18 of the invention will now be described in detail. FIG. 4 shows the actual tip and ring connections through the loop path control circuit 22 and the hybrid circuit 24. Leads T1 and R1 connect the converter 18 to the calling station through the finder circuit 20 and the trunk circuit 16. Leads TO and RO connect the converter 18 to the called station via finder circuit 20 and the other switching network. The hybrid circuit 24 comprises two standard telephone hybrids 42 and 44 connected back to back each of which is commonly used for passing AC signals while blocking the passage of DC signals. As used herein the hybrids 42 and 44 are used to route AC signals through the converter 18 via two different paths, the path selected being dependent upon the telephone terminal from which the signal is originated. For example, AC dial tone from the other switching network via leads TO and RO is transmitted to the calling station. via leads T1 and R1 through a first path of the hybrid circuit 24 which includes hybrid 44, a low pass filter 46, an automatic gain control amplifier 48 and hybrid 42. Multifrequency calling signals from the calling station via leads T1 and R1 are transmitted to the multifrequency receiver-dial pulse generator 28 for processing through a second path of the hybrid circuit 24 which includes hybrid 42, a low pass filter 50 and an amplifier 52. Another amplifier 54 connects the second path to the hybrid 44 to permit two way audio transmission as will be explained shortly.

Hybrid 44 routes AC signals from the other switching network through the first path while effectively blocking them from being applied to the second path. Hybrid 42 routes AC signals from the calling station through the second path while effectively blocking them from being applied to the first path. Thus the AC signals from the other switching network and the calling station are separated in the hybrid circuit 24. Hybrids 42 and 44 are designed to materially attenuate AC signals passing therethrough from one of the paths of the hybrid circuit 24 to the other path so as to maintain the signal separation. The AGC amplifier 48 functions with hybrid 42 to provide a sufficient signal level of dial tone to the calling station while materially attenuating the portion of the signal through hybrid 42 which is applied to the second path so that it produces no consequential feedback effects.

When the trunk circuit of the other switching network is initially seized dial tone which may be nonprecise is transmitted back to the calling station via the first path of the hybrid circuit 24 to apprise the caller that he may begin keying the called number. Multifrequency calling signals from the calling station are applied to the multifrequency receiver-dial pulse generator 28 for processing through the second path of hybrid circuit 24. Because of the aforementioned design characteristics of the hybrids 42 and 44 the dial tone signal from the other switching network is effectively blocked from reaching the receiver-generator 28 so that it cannot be mixed with the multifrequency signals applied thereto to produce a transmuted and unrecognizable signal not suitable for processing.

As discussed earlier the converter 18 is designed to automatically release upon passage of a preset period of time following outpulsing of the last digit if release has not yet been effectuated by an answer supervision signal or keying the special feature pushbutton. Since in this situation the called party may answer the call before the preset period has elapsed, provision must be made for transmitting audio signals through the converter 18 until it is automatically released. Thus the need for amplifier 54. Although it is not required for signalling purposes, amplifier 54 is required to provide a completed path for audio signals from the caller to the called party during the interim that conversation takes place while the converter 18 has not yet released automatically. Audio signals from the called party to the caller are transmitted via the first path of the hybrid circuit 24 with no problem.

So long as none of the other switching networks have equipment to handle multifrequency signalling the passage of multifrequency calling signals through amplifier 54 together with transmission of their equivalent dial pulse signals through the loop path control circuit 22 creates no problem since the multifrequency signals will not be detected and processed at the receiving end in the other switching network. When at least one of the other switching networks is equipped to handle multifrequency signalling a problem does arise however since the signal receiving equipment therein will detect and attempt to process both the multifrequency and dial pulse signals each of which are arriving at different rates. This undesirable situation is avoided by eliminating amplifier 54 from the hybrid circuit 24, thereby preventing the multifrequency signals from being transmitted to the other switching network. When this is necessary, in the absence of answer supervision local subscribers must release the converter 18 by keying the special feature pushbutton in order to immediately establish a two way talking path once a call is answered.

Upon seizure of the converter 18 a grounded DC power supply 56 is connected to leads T1 and R1 through the hybrid 42 and a balanced two winding relay L in the loop path control circuit 22. Th closed hookswitch of the caller's telephone subset completes a DC path for current to flow through relay L (via the two transformer windings shown in hybrid 42) thereby energizing it. Relay L operated, closes normally open contacts L-1 in lead RO completing a DC path via the two transformer windings shown in hybrid 44 to the trunk circuit in the other switching network. A polarized relay 58 in this closed path operates to indicate continuity and proper polarity for the T0 and R0 leads which turns on the amplifier 48 thereby permitting dial tone to be returned to the calling station. If the caller is using a pushbutton telephone, the multifrequency calling signals which follow will not affect relay L and contacts L-1 will remain closed. If the caller is using a rotary dial telephone however, relay L will be intermittently interrupted as the first digit is dialed causing contacts L-1 to open and close thus generating and transmitting the proper number of dial pulses to the other switching network. When relay L initially releases to produce the first dial pulse of the first digit, it actuates the dial pulse detector 26 causing a release relay (not shown) therein to operate after the last dial pulse for the first digit has been transmitted. Normally closed contacts of the release relay located in the loop path control circuit 22 are opened at this time thereby interrupting the path extending the sleeve ground from the trunk circuit 16 to converter 18. The converter 18 and finder circuit 20 release and contacts in the trunk circuit 16 revert to their normal position to permit the dial pulses for the second and all subsequent digits to be transmitted directly therethrough to the other switching network.

When multifrequency signalling is employed a readout check circuit in the memory and readout control circuit 34 checks that each multifrequency signal processed contains exactly two AC frequencies just before the corresponding digit is outpulsed. A positive check energizes a relay in the circuit actuating a pair of RK contacts in the loop path control circuit 22 which disconnects the R0 lead from the hybrid 44 and establishes a partially completed short circuit path between leads R0 and T0 via normally open contacts PG and W-1 connected in parallel. Contacts PG are controlled by a pulse generating relay in the dial pulse count and control circuit 38 which is continuously energized and deenergized. As the PG contacts close and open in response thereto a short circuit is intermittently placed across leads T0 and R0 thus opening and closing the telephone loop to the other switching network. The local battery in the loop causes current to flow each time the PG contacts close thereby providing dial pulses. When the proper number of dial pulses for a digit have been transmitted contacts W-1 close shorting T0 and R0 so that the pulsing PG contacts have no further effect. Contacts W-1 are actuated by a timing relay (not shown) in the dial pulse count and control circuit 38 during each interdigital period viz. the fixed period of time between the last dial pulse of a digit outpulsed and the first dial pulse of the next digit outpulsed. If answer supervision is provided a relay 60 in the loop path control circuit 22 recognizes the returned signal and effectuates release of the converter 18 and finder circuit 20 as described hereinbefore.

Figure 5:
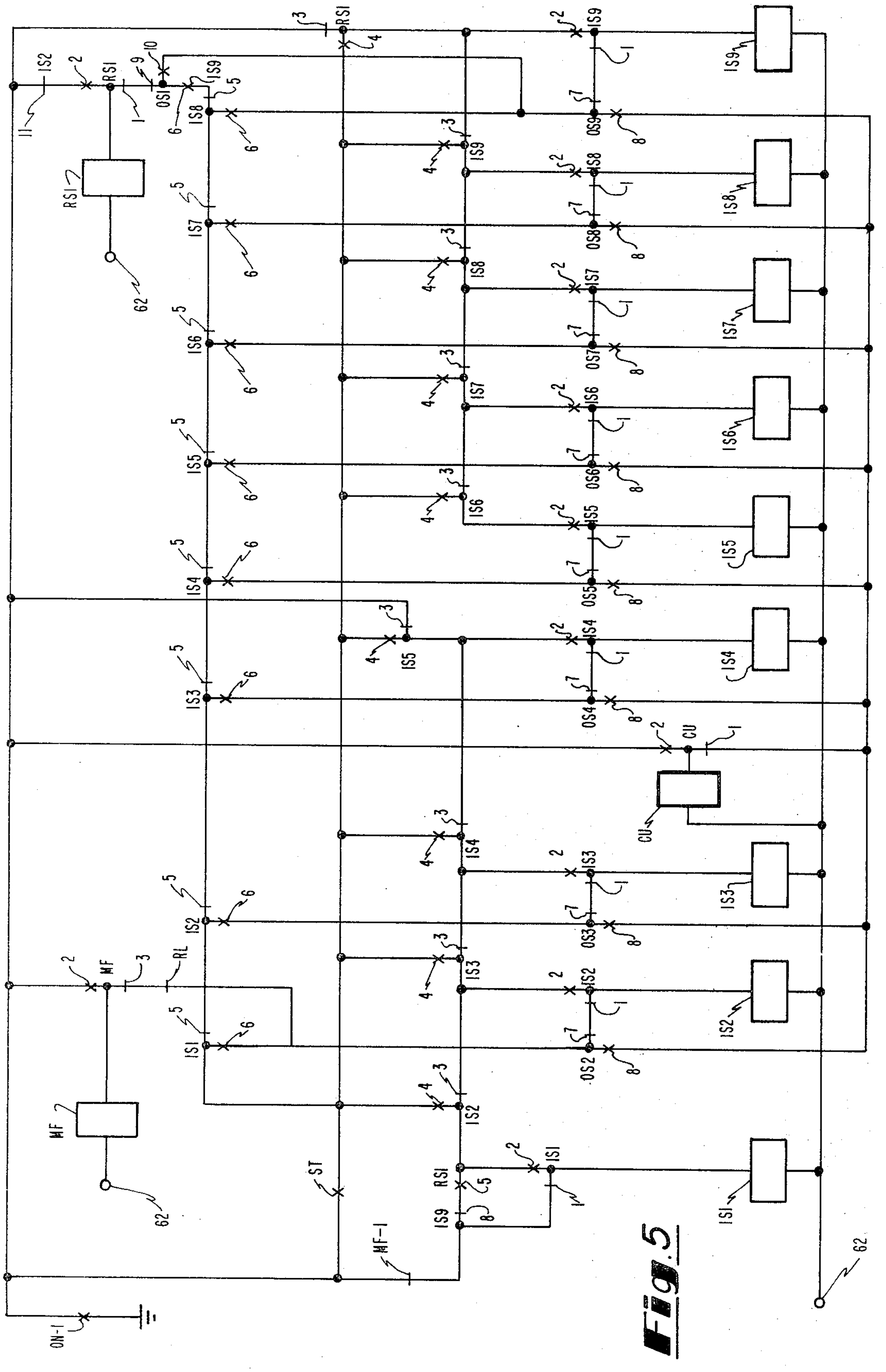
FIG. 5 is a schematic of the in-digit steering chain shown in FIG. 2.

The in-digit steering chain 36, detailed in FIG. 5, includes nine control relays IS1–IS9 which control the routing of digit information to the nine memory units of the called digit memory and readout control circuit 34, a recycling relay RSI for effectuating recycling when required and a relay MF which s energized whenever multifrequency calling signals are received. Each control relay (IS1–IS9) controls a different memory unit through normally open relay contacts located in the circuit path (not shown) to the memory unit from the translator circuit 32. Thus when a control relay is energized its associated memory unit is enabled to receive signal information for storage upon actuation of a start relay (not shown) which is common to all nine control relays. Once storage of a particular digit is accomplished the release of the control relay together with the energization of the next successive relay enables the next memory unit to receive information for the next digit.

When the converter 18 is seized a relay in the loop path control circuit 22 operates which closes contacts ON-1 in the steering chain 36 thereby providing a connection to ground for operating the various relays. Since all relays already have one terminal connected to the non-grounded terminal 62 of a grounded DC source a relay is made to operate by applying ground to its other terminal. The closing of contacts ON-1 extends ground to a terminal of relay IS1 through normally closed contacts MF-1 of relay MF and normally closed contacts IS1-1 of relay IS1 causing it to operate. Relay IS1, operated, opens its normally closed contacts IS1-1 breaking the connection to ground. Relay IS1 remains energized however by a locking path to ground through closed contacts IS1-2 and normally closed contacts IS2-3, IS3-3, IS4-3 and IS5-3 thus enabling the first memory unit to receive information for the first multifrequency calling signal to be received for processing when the start relay is first actuated.

The sequential operation of the control relays (IS-1–IS9) is accomplished through normally open contacts ST in the steering chain 36 under the control of the start relay. The start relay is in the translator circuit 32 and is momentarily energized each time a multifrequency calling signal is received by the converter 18. When the first multifrequency signal is received the ST contacts close to extend ground to relay IS2 via normally closed contacts IS2-1 and OS2-7 and closed contacts IS1-6. Relay IS2 operated locks itself to ground through closed contacts IS2-2 and normally closed contacts IS3-3, IS4-3 and IS5-3. Actuated contacts IS2-3 and IS2-4 disconnect relay IS1 from the locking path to ground and connect it directly to ground through contacts ST so that it remains energized until the start relay is deenergized at the termination of the first multifrequency signal. Although both relays IS1 and IS2 are energized while the first multifrequency signal is received only the first memory unit is enabled to receive the signal information since normally closed contacts (not shown) of relay IS1 in the circuit path to the second memory unit are open at this time to block the passage of information therethrough. Contacts IS2-6 are closed at this time to prepare a path for energizing relay IS3 through normally closed contacts IS1-5 at the beginning of the second multifrequency signal. When the first multifrequency signal terminates the start relay releases, contacts ST open and relay IS1 releases since its only connection to ground is broken. Relay IS1 is prevented from operating again through normally closed contacts IS1-1 and MF-1 by the operation of relay MF which is held energized through closed contacts MF-2 while the converter 18 is seized. Relay MF is initially energized through normally closed contacts MF-3 and RL (the latter being controlled by a relay in the dial pulse detector 26 which is energized only when dial pulse signals are received) and closed contacts IS1-6 and ST when the first multifrequency signal is received.

When the second multifrequency signal is received contacts ST close again causing relay IS3 to operate through a path including normally closed contacts IS3-1 and OS3-7, closed contacts IS2-6 and normally closed contacts IS1-5. Relay IS3 locks itself to ground through normally closed contacts IS4-3 and IS5-3. The operation of relay IS2 is made dependent on the start relay by the actuation of contacts IS3-3 and IS3-4 so that relay IS2 is now held to ground through closed contacts IS2-2 and IS3-4. At this time opened contacts of relay IS2 in the memory and readout control circuit 24 block the third memory unit from receiving information while the information for the second digit is stored in the second memory unit. The foregoing process is repeated throughout the operation of the steering chain 36 each control relay being energized in sequence. Each control relay is energized when the multifrequency signal routed by the preceding relay is received so that it will be prepared to route the next multifrequency signal. At the same time the preceding control relay is switched so that it is held energized through the ST contacts rather than through the locking path. When a multifrequency signal is terminated the control relay associated therewith is released and the next multifrequency signal is automatically routed by the next relay.

The closure of the ST contacts when the ninth multifrequency signal is received causes the recycling relay RSI to operate through the normally closed contacts RS1-1 and OS1-9, closed contacts IS9-6 and the normally closed contacts (IS1-5)–(IS8-5). Relay RS1, operated, locks itself to ground through closed contacts RS1-2 and normally closed contacts IS2-11. Relay RS1 also closes contacts RS1-5 which prepares a path for once again operating relay IS1 through normally closed contacts (IS2-3)–(IS5-3) should recycling be required to handle more than nine digits. When the ninth multifrequency signal terminates, relay IS9 releases thereby, restoring contacts IS9-8 to their normally closed position which completes a path for operating relay IS1 through the aforementioned contacts and through normally closed contacts IS1-1. Once operated relay IS1 is prepared to route a tenth digit signal to the first memory unit which starts the whole cycle again. This recycling can be repeated any number of times. The operation of relay IS2 during recycling opens contacts IS2-11 breaking the holding connection to relay RS1.

Figure 6:
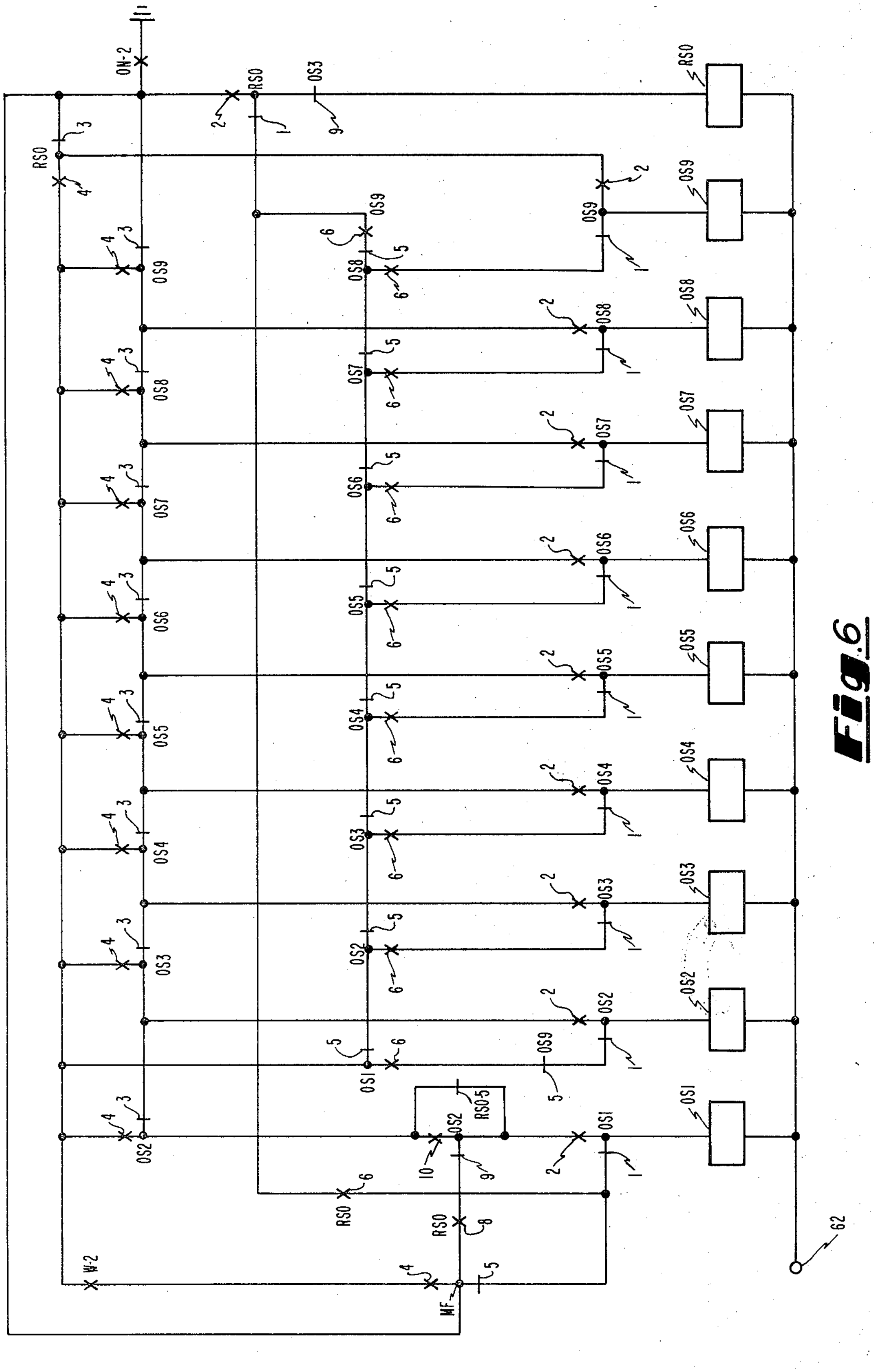
FIG. 6 is a schematic diagram of the out-digit steering chain shown in FIG. 2.

The out-digit steering chain 40 shown in detail in FIG. 6 operates in similar fashion. There are nine control relays OS1–OS9 each of which controls a different memory unit through normally open relay contacts located in the circuit path connecting the memory unit to readout relays (not shown) in the memory and readout control circuit 34. These readout relays have contacts in the dial pulse count and control circuit 38 for selecting the proper number of dial pulses for each digit outpulsed. When a control relay (OS1-OS9) is energized its associated memory unit is enabled to release the stored signal information to the readout relays for outpulsing. The control relays are energized in sequence thereby sequentially enabling their associated memory units. This sequential operation is accomplished by contacts W-2 in the steering chain 40 under the control of the timing relay in the dial pulse count and control circuit 38 which as mentioned earlier is energized during each interdigital period.

As with the in-digit steering chain 36, the out-digit steering chain 40 has normally open contacts ON-2 which close when the converter 18 is seized to provide a connection to ground for operating the various relays. This ground is extended to relay OS1 through the normally closed contacts MF-5 of relay MF and the normally closed contacts of OS1-1 of relay OS1. Relay OS1 operated locks to ground via closed contacts OS1-2 and normally closed contacts RSO-5 of a recycling relay RSO and normally closed contacts (OS2-3)–(OS9-3). Relay OS1 operated also closes contacts OS1-6 to prepare a path for operating relay OS2. Contacts of relay OS1 in the memory and readout control circuit 34 close at this time to connect the first memory unit therein to the dial pulse count and control circuit 38 even before the first multifrequency signal is received for processing. As mentioned previously the first digit signal is stored and outpulsed at the same time. When the first interdigital period occurs following outpulsing of the first digit, contacts W-2 close extending ground to relay OS2 via closed contacts MF-4 (recalling that relay MF operates when the first multifrequency calling signal is received), closed contacts OS1-6 and normally closed contacts OS9-5 and OS2-1. Relay OS2 operated locks to ground through closed contacts OS2-2 and normally closed contacts (OS3-3)–(OS3-9). Actuated contacts OS2-3 and OS2-4 disconnect relay OS1 from the locking path to ground and connect it to ground through contacts W-2 so that it remains energized until the timing relay is deenergized at the termination of the first interdigital period. Although relay OS2 is energized during the interdigital period, the second memory unit which it controls cannot release its stored information since its path to the readout relays in the memory and readout control circuit 34 is blocked by opened contacts of relay OS1 located therein. At the termination of the first interdigital period the timing relay releases opening the W-2 contacts causing relay OS1 to release. The OS1 relay contacts blocking the path to the readout relays close, thereby enabling the second memory unit to release its stored information for outpulsing the second digit. When this is completed the second interdigital period begins, starting with the closing of the W-2 contacts and energization of relay OS3. Thus each control relay (OS1-OS9) is energized in sequence to sequentially enable its associated memory unit to release its stored information for outpulsing following the interdigital period during which it was first energized. Each control relay has normally closed contacts in the path from the readout relays to the memory unit following the one it controls so that the latter is not enabled to release its stored information until the end of the interdigital period when the preceding control relay is released.

Recycling is accomplished through the recycling relay RSO which is actuated during the interdigital period following out-pulsing of the ninth digit. At this time relay OS9 is operated so that when contacts W-2 close, ground is extended to relay RS0 through normally closed contacts OS3-9 and RS0-1, closed contacts OS9-6, normally closed contacts (OS1-5)–(OS8-5) and closed contacts MF-4. Once operated relay RS0 is held operated through closed contacts RS0-2. As soon as relay RS0 operates relay OS1 also operates through a path including normally closed contacts OS1-1, closed contacts RSO-6 and OS9-6, normally closed contacts (OS1-5)–(OS8-5) and closed contacts W-2 and MF-4. Once operated relay OS1 is held operated through closed contacts OS1-2, normally closed contacts OS2-9 and closed contacts RS0-8. When the interdigital period ends relay OS9 releases and energized relay OS1 enables the first memory unit in the memory and readout control circuit 34 to release its information for outpulsing the tenth digit thus starting the sequence all over again. As with the indigit steering chain 35 the out-digit steering chain can be recycled any number of times. The recycle relay RS0 is released by the actuation of relay OS3 which opens contacts OS3-9 breaking the connection to ground.

When the recycle feature is used it creates the possibility of an undesirable condition wherein a memory unit is called upon to store another digit before it has released the information for the earlier digit stored therein. This condition known as "catchup" could occur when the caller keys the called number so rapidly that the generated dial pulse signals cannot keep reasonable pace with the multifrequency signals received. Thus before or while outpulsing is performed for a digit whose position in the called number will be designated $x$ the converter 18 receives a multifrequency calling signal for a digit whose position is $x+9$. If these two digits have the same numerical value then the later digit will be omitted from being outpulsed and if their numerical values are different a distorted digit having more than two out of five frequencies will be detected by the readout check relay in the memory and readout control circuit 34. The former will result in a wrong number or perhaps one that is not assigned while the latter will cause the converter 18 to release while registering a fault condition. Both of these situations are undesirable.

A catchup relay CU in the in-digit steering chain 36 detects "catchup" conditions and operates to prevent the foregoing situations from occurring. When energized, relay CU causes the converter 18 to release and a tone to be returned to the caller apprising him to start keying again. Whenever the caller keys eight digits more than the digit being outpulsed relay CU is energized through a path which includes closed contacts of the energized control relay in the in-digit steering chain 36 and closed contacts of the energized control relay following its counterpart in the out-digit steering chain 40. For instance, assume the fourth digit is being outpulsed and that coincident therewith the eighth one of eight subsequent digits is just being received by the converter 18. Then contacts OS4-8 and IS3-6 will be closed extending ground to relay CU via normally closed contacts CU-1, IS1-5 and IS2-5 and closed contacts ST. Relay CU operated locks to ground directly and initiates release of the converter 18.

The multifrequency to dial pulse signal converter of the invention as disclosed herein eliminates the transmutation of multifrequency calling signals by nonprecise dial tone into unrecognizable signals not suitable for processing and in addition provides capability for processing an unlimited number of calling signals. Although only one specific embodiment of the converter has been described, other embodiments may be readily apparent to those familiar with the art which would not be without the ambit of the scope and the spirit of the invention.

What is claimed is:

1. In a multifrequency to dial pulse signal converter used in a first telephone switching network which is arranged to establish connections between any of a plurality of local stations and other switching networks via individual two-wire circuits, each of the two-wire circuits being arranged to transmit both dial pulse signals from the converter to the other switching networks and dial tone back from the other switching networks to the first switching network, the multifrequency to dial pulse signal converter being arranged to convert multifrequency calling signals received from local stations to dial pulse signals for transmission to other switching networks, an improvement comprising:

means for separating the multifrequency calling signals from the dial tone transmitted back from the other switching networks so that only the multifrequency signals are processed by the converter, the means for separating including a four wire hybrid circuit connected so that AC signals between the calling station and the other switching network are transmitted therethrough over two different paths, the path being dependent on from where the signal originated.

2. The improvement of claim 1 wherein the converter includes a multifrequency detector for receiving the multifrequency calling signals to be processed, said detector being connected to the hybrid circuit path over which AC signals from the calling station are transmitted.

3. The improvement of claim 1 including an automatic gain control amplifier connected in the hybrid circuit path over which AC signals from the other switching network are transmitted.

4. In a multifrequency to dial pulse signal converter used in a telephone switching network for converting multifrequency calling signals received from local stations to dial pulse signals for transmission to other switching networks wherein the converter includes a plurality of memory units, including first through last memory units, for storing digit information before the digits are outpulsed and wherein the converter is seized in response to an outgoing call, an improvement comprising:

a first steering circuit for sequentially enabiling the memory units to store the digit information as the multifrequency signals are received, including means for continuously recycling said sequential enabling operation in response to successive enablings of the last memory unit to store the digit information, and a second steering circuit for sequentially enabling the memory units to release the stored information for digit outpulsing, including means for continuously recycling said sequential enabling operation in response to successive enablings of the last memory unit to release the digit information, whereby as many digits as are received by said converter for each said outgoing call may be stored and outpulsed for each said outgoing call.

5. The improvement of claim 4 wherein said first steering circuit comprises circuit means for initiating release of the converter to prevent an individual one of said memory units from processing more than one digit at a time.

6. The improvement of claim 4 including means for automatically releasing the converter after the passage of a preset period of time following outpulsing of the last digit of the called number.

7. The improvement of claim 4 including means for automatically releasing the converter in response to an answer supervision signal received when a telephone call is answered.

8. The improvement of claim 4 including means for releasing the converter in response to a signal received from the calling station when a special pushbutton of the telephone subset is keyed.

9. The improvement of claim 4 including means for separating the multifrequency calling signals from the dial tone transmitted back from the other switching networks so that only the multifrequency signals are processed by the converter.

10. The improvement of claim 9 wherein said separating means consists of a four wire hybrid circuit connected so that AC signals between the calling station and the other switching network are transmitted therethrough over two different paths, the path being dependent on from where the signal originated.

11. The improvement of claim 10 wherein the converter includes a multifrequency detector for receiving the multifrequency signals to be processed, said detector being connected to the hybrid circuit path over which AC signals from the calling station are transmitted.

12. A multifrequency to dial pulse signal converter to be used in a first telephone switching network which is arranged to establish connections between any of a plurality of local stations and other switching networks via individual two-wire circuits, each of the two-wire circuits being arranged to transmit both dial pulse signals from the converter to the other switching networks and dial tone back from the other switching networks to the first switching network, the multifrequency to dial pulse signal converter being arranged to convert multifrequency calling signals received from local stations to dial pulse signals for transmission to other switching networks, wherein the converter is seized in response to an outgoing call, comprising:

a loop path control circuit connected in the telephone path between the local station and the other switching network having dial pulse means to produce dial pulses for transmission to the other switching network;

a dial pulse detector coupled to said loop path control circuit for releasing the converter when the first calling signal comprises dial pulses after first repeating said dial pulses via said dial pulse means;

a hybrid circuit having two separate paths therein connected in the telephone path such that AC signals from the calling station are transmitted over a first one of said two paths and AC signals from the other switching network are transmitted over the second one of said two paths;

a multifrequency receiver-dial pulse generator connected to the first one of said two paths for controlling said dial pulse means in response to the multifrequency calling signals received therein;

an in-digit steering chain for controlling the storage of digit information in said multifrequency receiver-dial pulse generator as the multifrequency signals are received, and an out-digit steering chain for controlling the release of digit information in said multifrequency receiver-dial pulse generator as digits are outpulsed.

13. The converter of claim 12 wherein said multifrequency receiver-dial pulse generator comprises a plurality of memory units which are sequentially enabled by said in-digit and out-digit steering chains to respectively store and release said digit information, each successive digit in the called number being processed by the next one of said memory units.

14. The converter of claim 13 wherein said in-digit and out-digit steering chains each have a plurality of control relays equal in number to said plurality of memory units and each one of said control relays enables a different one of said memory units when energized.

15. The converter of claim 14 wherein said in-digit and out-digit steering chains each includes a recycling relay which is actuated whenever the last one of said control relays in the chain is energized, thereby causing the first one of said control relays to be energized again.

16. The converter of claim 15 wherein said in-digit steering chain includes a catchup relay which is energized whenever a control relay therein is actuated at the same time as the control relay which follows the corresponding control relay in said out-digit steering chain to institute release of the converter to prevent an individual one of said memory units from processing more than one digit at a time.

17. The converter of claim 15 including means for automatically releasing the converter after the passage of a preset period of time following outpulsing of the last digit of the called number.

18. The converter of claim 15 including means for automatically releasing the converter in response to an answer supervision signal received when a telephone call is answered.

19. The converter of claim 15 including means for releasing the converter in response to a signal received from the calling station when a special pushbutton of the telephone subset is keyed.

* * * * *